March 1, 1960     W. R. HOWARD     2,926,551
VARIABLE SPEED TRANSMISSION
Original Filed June 26, 1953     2 Sheets-Sheet 1

INVENTOR.
WAYNE R. HOWARD
BY
Kenneth C. Witt
ATTY.

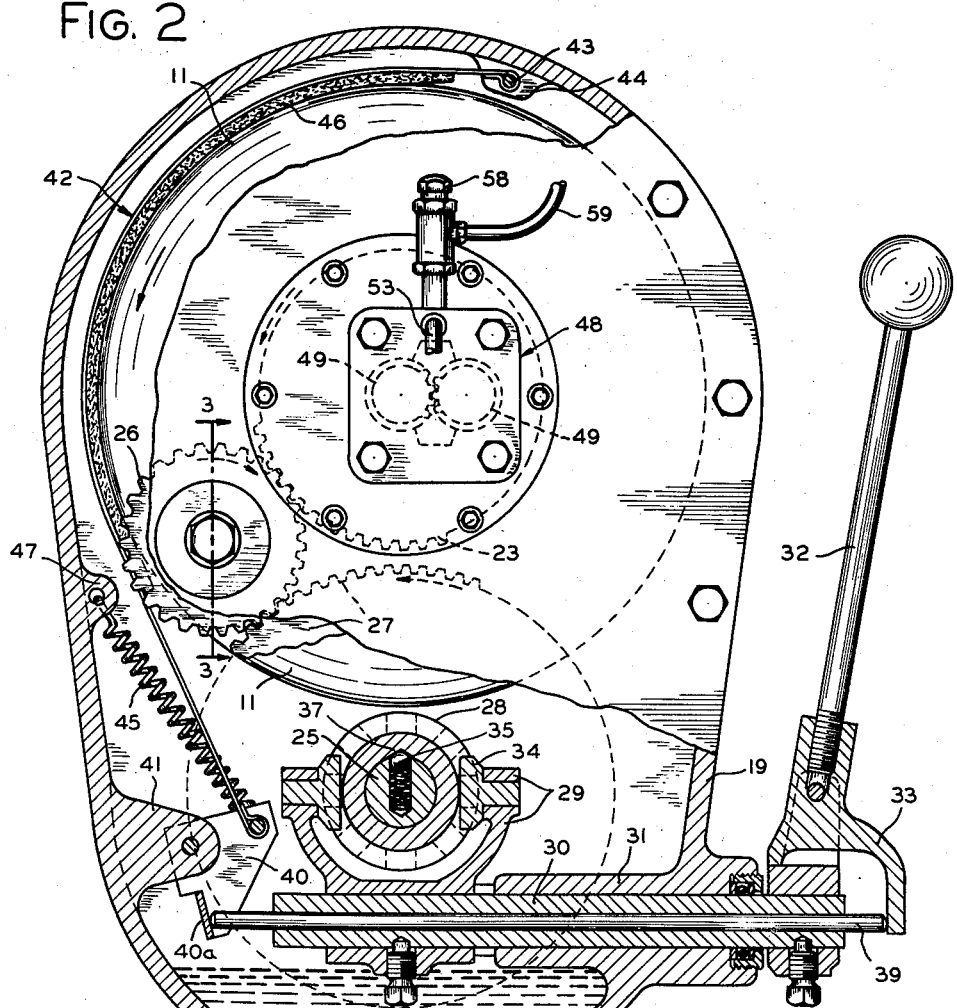
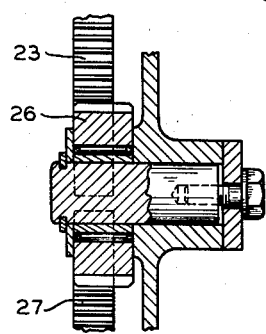
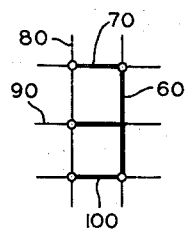

United States Patent Office 2,926,551
Patented Mar. 1, 1960

2,926,551
VARIABLE SPEED TRANSMISSION

Wayne R. Howard, Jackson, Mich., assignor to Clark Equipment Company, a corporation of Michigan Continuation of application Serial No. 364,326, June 26, 1953. Divided and this application July 30, 1956, Serial No. 600,899

18 Claims. (Cl. 74—718)

This invention relates to variable speed transmissions and, more particularly, to improvements in change speed gearing used in combination with hydraulic torque converters or fluid couplings.

The present application is a continuation of my application Serial No. 364,326, filed June 26, 1953, now abandoned.

One of the objects of the present invention is to provide an inexpensive and compact change speed gear mechanism for a hydraulic transmission.

Another object of the invention is to provide a hydraulic transmission in association with a change speed gear set with a simple and novel shifting mechanism.

Still another object of the invention is to provide a hydraulic torque converter with a compact and inexpensive forward, neutral, and reverse gear set.

A further object of the invention is to provide a hydraulic torque converter and gearing assembly with a simple and compact oil circulatory system which functions to reduce the maintenance and cost of production.

Another object of the present invention is to provide a small compact hydraulic transmission with a forward and reverse gear or a two-speed gear set for use in trucks, tractors, industrial lift trucks, motorcycles, motor-scooters, and the like.

Other objects, more or less ancillary to the foregoing, will be obvious from the following description.

Where a hydraulic torque converter or fluid coupling is used as a transmission for vehicles such as trucks, motor-scooters, motorcycles, industrial lift trucks, tractors, and the like, it is generally necessary to provide such a vehicle with a gear box containing a reduction gear, a reverse gear, and, in some cases, two or more forward reduction gears.

It has been the common practice to place the gear box rearwardly of a hydraulic transmission; thus, by necessity, the transmission combination has a relatively long horizontal axis. The provision of a gear box including forward, neutral, and reverse, or two forward speed gearings, is a rather expensive unit since the drive shafts, bearings therefor and shifting mechanism obviously entail high manufacturing expense. The use and application of a combination hydraulic transmission and gear box has had its limitation in the past because of the overall length of a hydraulic torque converter and gear box, especially where spatial limitation is critical, such as in motor-scooters, motorcycles, garden tractors, and the like.

The present invention will overcome the objections of the present and prior art hydraulic transmissions and associated change speed gear transmission, from the standpoint of cost and length, by virtue of a novel arrangement of the change speed gears and mechanism for shifting the same.

Referring to the drawings:

Fig. 2 is a view taken on line 2—2 of Fig. 1 with certain fragments broken away in the interest of clarity;

Fig. 3 is a fragmentary detail view showing the idler gear in the reverse gear assembly; and Fig. 4 is a diagrammatic representation of the brake lever positions during the operational cycle.

Figure 1:
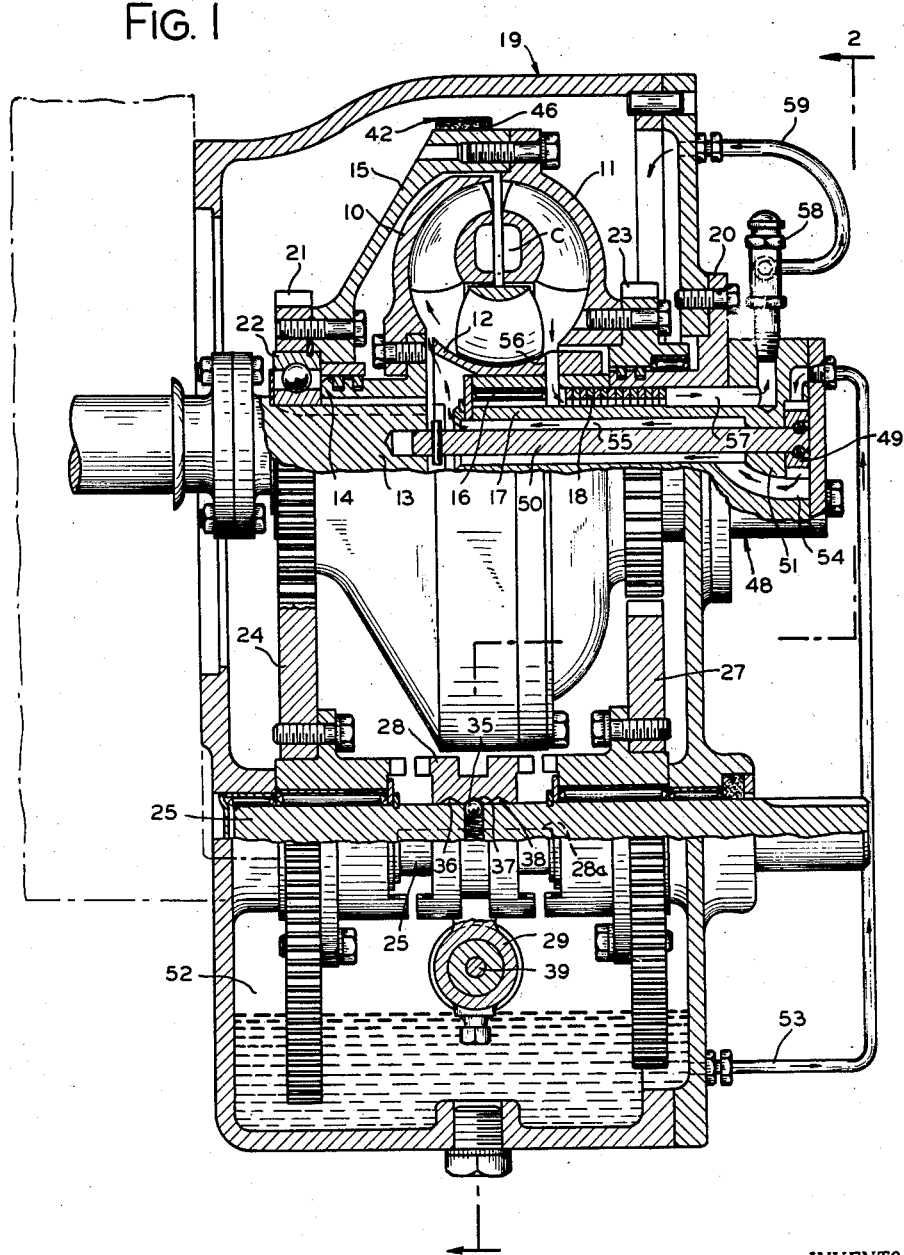
Fig. 1 is a vertical sectional view of the transmission with fragmentary portions thereof broken away in the interest of clarity.

The transmission as illustrated herein is composed of a hydraulic torque converter C, consisting of a pump 10, a turbine 11 and a reaction member 12. The pump is coupled directly to an engine crankshaft 13 through pump hub 14. The turbine is coupled directly to a turbine cover 15 so that said cover will rotate with the turbine. The reaction member is mounted on a bearing 16 which is supported by an oil pump housing extension 17. The reaction member is locked in one direction by a one-way brake 18 which, in turn, is affixed to the transmission housing 19 through the medium of a flange 20.

A forward gear 21 is mounted on bearing 22 and attached to the turbine cover 15, and a reverse gear 23 is mounted on a suitable bearing and attached to the turbine. The forward turbine gear 21 is meshed with a forward countershaft gear 24 supported on suitable bearings and carried by a countershaft 25. The countershaft 25 extends outside the housing 19 and functions as the output from the transmission, the extension being available for a connection to the mechanism being driven. The turbine reverse gear 23 is intermeshed with an idler gear 26 (Fig. 3) which meshes with the countershaft reverse gear 27 supported on said countershaft 25. A sliding dog clutch 28, or equivalent mechanism, is supported on the countershaft, the driving connection being made by a key 28a, and is actuated by movement of a shifting fork 29 which is interlocked with a shifting lever 32.

Forward direction is realized by sliding the clutch into toothed engagement with the hub of the countershaft forward gear 24, thus causing power to flow from the rotating turbine cover 15 through the turbine forward gear 21 which is meshed with the countershaft forward gear 24. Since the clutch 28 is keyed to the countershaft 25 forward rotative movement thereof will be effected. Reverse rotation is obtained by moving the said clutch mechanism to the right, thus locking the countershaft to the countershaft reverse gear 27, which, in turn, is entrained with the idler gear 26 which is in meshed engagement with the reverse turbine gear 23.

Shifting system

Referring to Fig. 2, the gear shift control mechanism comprises the shifter fork 29 secured upon a sleeve 30 mounted for rotative movement in a boss 31 in the gear case housing 19. The opposed end of the sleeve is provided with a combined gear shift and brake lever 32 which is formed with a depending ear 33 on the outer face thereof. The shifter fork 29 is formed in the customary manner with shoes 34 engaged in a groove in the dog clutch element 28 which is restrained against accidental movement by a spring pressed ball 35 adapted for seated engagement in the recesses 36, 37 and 38. The sleeve is machined for the reception of a push rod 39 having the ends thereof disposed in abutting engagement with the depending ear 33 and a web 40a in a bell crank 40 mounted for pivotal movement on a boss 41 in the housing 19.

The upper end of the bell crank 40 is coupled with a brake band 42 which is anchored on a pin 43, mounted in a boss 44 on the inner face of the housing 19. The brake band is faced with a friction material 46 of the type commonly employed in mechanism of this character and is designed for engagement with the circumferential wall of the turbine cover 15. The upper end of the bell crank 40 is coupled with a contractile spring 45 mounted in a boss 47 in the housing 19 and disposed to effect the elevation of the bell crank 40 in order to sustain the brake band in normal spaced relation with the turbine cover.

When selection of forward drive is made from neutral, the combination brake and shifting lever 32 is pushed laterally to the right until it reaches the braking position as indicated by line 60 in Fig. 4. Since the brake lever is capable of lateral movement and rotative movement, it will be seen that the brake will be maintained in engagement as the lever is rotated through a path of travel indicated diagrammatically by the line 60. Forward drive is accommplished by rotating the lever until the yoke 29 shifts the clutch into engagement with the gear 24 at which condition the lever will be in a position indicated by the line 70 in Fig. 4.

In normal operation with the gear shifting lever in neutral, the turbine assembly would be rotating because of the drag inherent in the assembly produced by the hydraulic fluid. It would be desirable to first move the lever to the line 60 representing the brake-on position and thence to the line 70 representing the forward drive position, whereupon release of the lever from the braking position allows it to return to the operating position represented by line 80. When the lever is at the point represented by the intersection of lines 70 and 80, the machine is in the normal operating forward gear drive with the brake released. To stop the machine, it is only necessary to return the lever along the operating line 80 to the neutral position indicated by line 90, thus disengaging the drive.

To reverse the machine after it has been standing in neutral, the lever is again moved to the braking position 60 and then rotated to th ereverse drive position indicated by line 100 in the diagram shown in Fig. 4, whereupon the lever is released to return to the reverse operating position at the intersection of line 80 and line 100. The drive may be disengaged by moving the lever along the line 80 to the neutral position.

It is not essential to apply the brake shifting the clutch mechanism unless the relative motion between the gears and the shaft 25 is such as to cause undue clashing. Accordingly, the function of the brake is to assist in the synchronizing of the elements of the clutch mechanism to facilitate shifting thereof. However, it is noted that the brake is always available for slowing or stopping the machine in which the transmission is installed by movement of the lever to the position indicated by line 60 irrespective of the position of the clutch device.

It will be seen from the foregoing description that the novel brake and shifting mechanism eliminates and elaborate and expensive synchromesh unit and provides a positive and efficient means of selecting gear ratios of the transmission.

*Oil pump and circulatory system*

This transmission is provided with a novel oil pump and circulatory system. The oil pump includes a housing 48 having gears 49 therein which are driven from the engine crankshaft 13 through a shaft 50 journalled in a bearing 51 in the oil pump housing extension 17. The oil which is drawn from the oil sump 52 through a conduit 53 enters the pump housing and passes through said gears where it is impelled under pressure through an outlet passage 54 in the pump, through a canal 55 in the extension of the oil pump housing 17 and into the pump side of the hydraulic torque converter. The oil then flows through an outlet orifice 56 on the turbine side of the torque converter, through a passageway 57 and into a relief valve 58, then out through an oil discharge line into the transmission housing 19. Thus, it will be seen that the arrangement of the oil pump and its oil circulatory circuit serves as an oil pump and an oil distributing system.

The extension 17 on the oil pump housing functioning as a supporting member for the reaction member and being drilled to provide inlet and outlet passages to the pump and turbine respectively simplifies the circulatory system and eliminates an oil seal required by ordinary designs. The unitary construction of the pump and extension allows the assembly to be easily made and maintenance time to be held to a minimum.

The foregoing disclosure is merely a preferred embodiment of the present invention and is not intended to limit the same to this specific showing.

Although the foregoing description is necessarily of a detailed character in order that the invention may be completely set forth, it is to be understood that the specific terminology is not intended to be restrictive or confining; and that various rearrangements of parts and modifications of design may be resorted to without departing from the scope or the spirit of the invention as herein claimed.

What is claimed is:

1. A variable speed transmission comprising a hydraulic torque converter and a two-speed gear train, said torque converter consisting of a pump, a turbine, a reaction member, a turbine cover, gears on said turbine cover and turbine, respectively, a housing encasing said hydraulic torque converter and said gears, a shaft in said housing, gears on said shaft entrained with gears on said turbine and said turbine cover, respectively, clutch means on said shaft for the selective engagement of the gears on the turbine with the shaft, and the gear on said turbine cover with the shaft, respectively.

2. A transmission comprising a hydraulic torque converter having a pump, a turbine, a reaction member, a turbine cover, a gear on the turbine, a gear on the turbine cover, a brake on the turbine cover, a housing encasing the hydraulic torque converter, a shaft in said housing, a gear on said shaft entrained with the gear on the turbine, a second gear on the shaft entrained with the gear on the turbine cover, a clutching means on said shaft for engaging either the first gear on the shaft or the second gear on the shaft, and means operably joined with the clutching means for actuating the brake on the turbine.

3. In combination with a hydraulic torque converter consisting of a driving member, a driven member, and a reaction member, forward driving gears driven by the driven member in constant mesh relationship with one another adapted for clutch engagement with a countershaft, synchronizing means for the countershaft and forward driving gears comprising a brake band engageable with the driven member of the hydraulic torque converter, manual means for actuating the brake band, and means for actuating a sliding-dog clutch mechanism on the countershaft after said brake band has been engaged and the gear set and countershaft are synchronized.

4. In combination with a hydraulic torque converter consisting of a driving member, a driven member, and a reaction member, forward and reverse driving gears driven by the driven member, in constant mesh relationship adapted for clutch engagement with a countershaft, synchronizing means for the countershaft and driving gears comprising a brake band engageable with the driven member of the hydraulic torque converter, manual means for actuating the brake band, and means for actuating a sliding-dog clutch mechanism on the countershaft after said brake band has been engaged and the selected gear set and countershaft are synchronized.

5. In combination with a hydraulic torque converter consisting of a driving member, a driven member, and a reaction member, forward driving gears driven by the driven member in constant mesh relationship with one another adapted for clutch engagement with a countershaft, synchronizing means for the countershaft and forward driving gears comprising a brake band engageable with the driven member of the hydraulic torque converter, manual means for actuating the brake band, and clutch mechanism for engaging the driving gears with the countershaft after said brake band has been engaged and the gear set and countershaft are synchronized.

6. A transmission comprising a hydraulic torque converter having a pump, a turbine, a reaction member, a gear on the turbine, a housing encasing the hydraulic torque converter, an oil pump assembly removably affixed to the outside of the housing, said assembly including an extension integral with the oil pump extending into the torque converter, said reaction member being mounted for rotation on said extension, said extension having passages for conducting oil to and from the torque converter.

7. A transmission comprising a hydraulic torque converter having a pump, a turbine, a reaction member, a gear on the turbine, a housing encasing the hydraulic torque converter, an oil pump assembly removably affixed to the outside of the housing, said assembly including an extension integral with the oil pump extending into the torque converter, said reaction member being mounted for rotation on said extension, said extension having a passage for conducting oil to the pump portion of the torque converter and a passage for conducting oil from the turbine portion of the torque converter to the oil pump.

8. A transmission comprising a housing, a hydraulic transmission unit therein having a driven element, gears on the driven element thereof, a shaft in said housing, gears on said shaft entrained with the gears on said driven element, and clutch means on said shaft for the selective driving engagement of the shaft with either of the gears on the shaft.

9. A transmission comprising a housing, a hydraulic transmission unit therein, consisting of a driving member, a reaction member, and a driven member, gears on said driven member, a shaft in said housing, gears on said shaft intermeshed with the gears on said driven member, and clutch means on said shaft for the selective driving engagement of the shaft with the gears on the driven member.

10. A variable speed transmission comprising a hydraulic transmission unit consisting of a driving element and a driven element, a housing encasing said hydraulic transmission, a shaft in said housing, gears on said driven element of the said hydraulic transmission entrained with gears on said shaft, and clutch and synchronizer means for the selective driving and synchronized engagement of the shaft with the gears on the hydraulic transmission.

11. A transmission comprising a housing, a hydraulic transmission unit therein, gears on the driven element thereof, a shaft in said housing, gears on said shaft entrained with the gears on said driven element, and clutch means on said shaft for selective driving engagement of the shaft with the gears on the driven element.

12. A transmission comprising a housing, a hydraulic transmission unit therein having a driven element, gears on the driven element thereof, a fluid pump assembly affixed to the housing, an extension integral with said fluid pump assembly extending into the driven element of the hydraulic transmission unit for coducting fluid thereto and supporting parts thereof.

13. A transmission comprising a housing, a hydraulic transmission unit therein having a driven element, power transmitting means carried by the said driven element, a fluid pump assembly affixed to the housing, a non-rotatable extension forming a portion of the said fluid pump assembly extending into the driven element of the said hydraulic transmission unit for conducting fluid thereto and supporting parts thereof.

14. A transmission comprising, a housing, a hydraulic transmission unit therein having a driven element, a fluid pump assembly affixed to the said housing, and a non-rotatable extension integral with said fluid pump assembly extending into the driven element of said hydraulic transmission unit for conducting fluid to the hydraulic transmission unit and supporting parts thereof.

15. A transmission comprising a housing, a hydraulic transmission unit therein having a plurality of fluid elements, a fluid pump assembly including a pump housing affixed to the said first mentioned housing, an extension forming a portion of the said pump housing extending into at least one of the fluid elements of the said hydraulic transmission unit for conducting fluid to the hydraulic transmission unit and providing support therefor.

16. A hydrodynamic coupling device comprising, a housing, fluid elements rotatably mounted in the said housing including a driven element, a fluid pump assembly including a pump housing affixed to the said first mentioned housing, an extension integral with said pump housing extending into the said driven element for providing support for and conducting fluid to the said fluid elements.

17. A hydrodynamic coupling device comprising, a housing, fluid driving and driven elements in the said housing, a fluid pump assembly affixed to the said housing, a non-rotatable extension forming a portion of said fluid pump assembly extending into at least one of the said elements for providing support therefor and for conducting fluid to the said elements.

18. A hydrodynamic coupling device comprising, a housing, fluid elements rotatably mounted in the said housing including a driven element, a fluid pump assembly affixed to the exterior of the said housing, and a non-rotatable extension integral with the said fluid pump assembly extending through an opening in the said housing into the said driven element for providing support for the fluid elements and conducting fluid thereto.

References Cited in the file of this patent
UNITED STATES PATENTS

| | | |
|---|---|---|
| 2,689,029 | McFarland | Sept. 14, 1954 |
| 2,728,427 | Lucia | Dec. 27, 1955 |
| 2,737,824 | Livermore | Mar. 13, 1956 |